United States Patent
Paek et al.

(10) Patent No.: US 6,636,684 B1
(45) Date of Patent: Oct. 21, 2003

(54) DISPERSIVE OPTICAL FIBER USING BINARY COMPONENT SILICA

(75) Inventors: Un-chul Paek, Kwangju (KR); Kyung-hwan Oh, Seoul (KR); Hong-seok Seo, Daejeon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/337,761

(22) Filed: Jun. 22, 1999

(30) Foreign Application Priority Data

Jun. 23, 1998  (KR) .......................  1998-23685

(51) Int. Cl.⁷ ............................. G02B 6/00; G02B 6/02
(52) U.S. Cl. ...................................... 385/142; 385/123
(58) Field of Search .................. 385/123, 142

(56) References Cited

U.S. PATENT DOCUMENTS 5,335,306 A    8/1994  Takita et al.

FOREIGN PATENT DOCUMENTS

| EP | 0 800 098 A2 | 10/1997 |
|---|---|---|
| EP | 0 800 098 A3 | 12/1997 |
| JP | 60-5040 | 1/1985 |
| JP | 60-90306 | 5/1985 |
| JP | 6-3548 | 1/1994 |
| KR | 83-1163 | 4/1983 |
| KR | 92-5729 | 4/1992 |

OTHER PUBLICATIONS

British Combined Search Examination Report of Sep. 15, 1999.
Korean Patent Office action dated Aug. 28, 2000.

*Primary Examiner*—Frank G. Font
*Assistant Examiner*—Amanda Merlino
(74) *Attorney, Agent, or Firm*—Robert E. Bushnell, Esq.

(57) ABSTRACT

A dispersive optical fiber having variable core-cladding refractive index differences depending on wavelength is provided. The dispersive optical fiber includes a core made of silica doped with a first dispersive material, and a cladding made of silica doped with a second dispersive material, wherein the refractive indices of the first and the second dispersive materials cross each other at a predetermined cross wavelength. The first and second dispersive materials include boron and fluorine. The dispersive optical fiber is attained by doping each dispersive material into the core and the cladding, respectively, thereby minimizing transmission loss, and is capable of being coupled to general optical fibers.

16 Claims, 8 Drawing Sheets

DISPERSIVE OPTICAL FIBER USING BINARY COMPONENT SILICA

CLAIM OF PRIORITY

This application makes reference to, incorporates the same herein, and claims all benefits accruing under 35 U.S.C. §119 from my application DISPERSIVE OPTICAL FIBER USING BINARY COMPONENT SILICA filed with the Korean Industrial Property Office on Jun. 23, 1998 and there duly assigned Serial No. 23685/1998.

BACKGROUND OF THE INVENTION

1. Field of the Invention

The present invention relates to a dispersive optical fiber having variable core-cladding refractive index differences depending on wavelength, and more particularly, to a dispersive optical fiber using binary-component silica glass.

2. Description of the Related Art

In general, the refractive index of a material is a function of the wavelength of light. For glasses used in optical fibers, the shorter the wavelength, the higher the refractive index. In conventional optical fibers used in optical devices, the core glass and cladding glass have similar spectral characteristics so that the refractive index difference between them is almost constant with respect to wavelength. The difference between the refractive indices of $GeO_2$ doped silica, used for the core, and $SiO_2$ used for the cladding, is almost constant with respect to wavelength. Therefore, it is not easy to obtain optical fiber devices with various spectral properties by using typical fibers.

An optical fiber having variable refractive index difference between core and cladding depending on wavelength is called a dispersive optical fiber. Optical devices using a dispersive optical fiber include optical fiber filters, wavelength insensitive couplers, wavelength-selective optical fiber couplers and the like.

A dispersive optical fiber has the following properties. First, the refractive index difference between the core and the cladding is dependent upon wavelength. Second, the refractive indices of to the core material and the cladding material become equal at a specific wavelength. Third, according to the wavelength of incident light, the incident light is propagated through either the core or the cladding. Currently known glass materials having highly dispersive characteristics and filter types using the same are shown in the following Table 1.

TABLE 1

| Core material | Cladding material | Cross wavelength ($\lambda_{cross}$) | Filter type |
|---|---|---|---|
| BaCED4 | F11 | 0.72 μm | Long |
| BaCD1 | ADF10 | 0.9 μm | Long |
| ADF10 | BaF7 | 1.62 μm | Short |
| LaF8 | FD13 | 0.82 μm–1.65 μm | Band pass |
| LaKN18 | SF10 | <0.6 μm | Long |
| SK6 | TiF6 | 0.67 μm | Long |
| TiF6 | SK1 | 0.87 μm | Short |

Conventional dispersive optical fibers are typically composed of multi-component glass and have a transmission loss greater than that of pure silica optical fibers. Also, since they have a low melting point, it is not possible to fusion-splice them with typical optical fibers. The conventional dispersive optical fibers are fabricated using a rod-in-tube technology in which a rod, i.e., a core material, is inserted into a tube, i.e., a cladding material, and heated and softened to remove the gap therebetween, thereby completing the optical fibers. However, the rod-in-tube technology is very complicated. Also, since the refractive index of multi-component glass is higher than that of typical glass, the splicing loss increases due to mechanical splicing of the multi-component glass with the typical glass.

SUMMARY OF THE INVENTION

It is therefore an object of the present invention to provide improved long and short wavelength pass, bandpass and band-rejection filters.

It is also an object of the present invention to provide an improved dispersive optical fiber.

It is a further object of the invention to provide a dispersive optical fiber having low transmission loss.

It is a yet further object of the invention to provide a dispersive optical fiber with reduced splicing loss.

It is a still further object of the invention to provide a dispersive optical fiber which may be fusion-spliced.

It is a still yet further object of the invention to provide a dispersive optical fiber which may be fabricated without using rod-in-tube technology.

To achieve the above objectives, the present invention provides a dispersive optical fiber having variable refractive index differences between the core and the cladding depending on wavelength, by using a binary-component silica material, rather than multi-component glass.

Accordingly, there is provided a dispersive optical fiber including a core made of silica doped with a first dispersive material, and a cladding made of silica doped with a second dispersive material, wherein the refractive indices of the first and the second dispersive materials cross each other at a predetermined cross wavelength.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
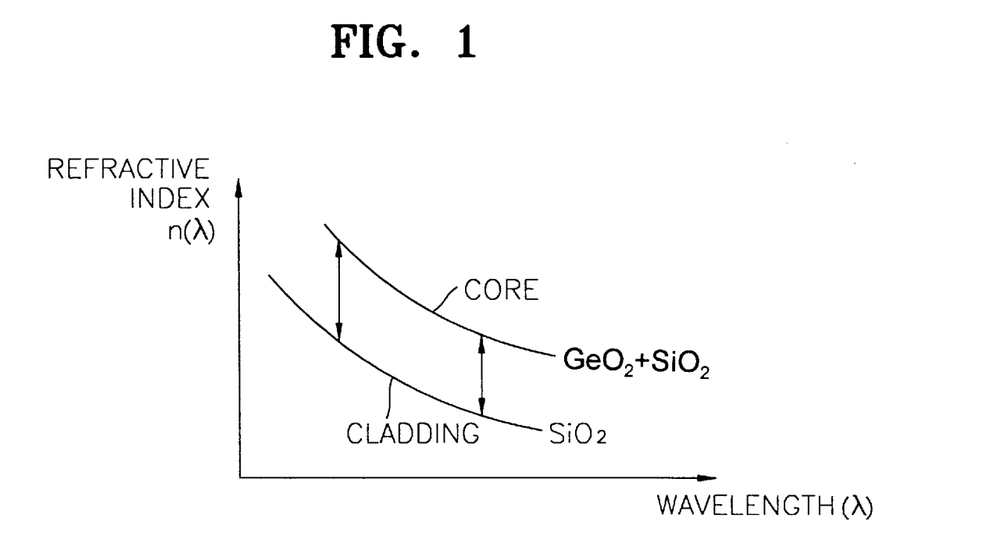
FIG. 1 is a graph showing the refractive index difference between the core and the cladding of a typical optical fiber.

Turning now to the drawings, FIG. 1 illustrates that the shorter the wavelength, the higher the refractive index. In conventional optical fibers used in optical devices, the core glass and cladding glass have similar spectral characteristics so that the refractive index difference between them is almost constant with respect to wavelength. As shown in FIG. 1, the difference between the refractive indices of $GeO_2$-doped $SiO_2$ and $SiO_2$ is almost constant with respect to wavelength. The higher refractive index curve, marked with $GeO_2+SiO_2$, is for the core, and the lower refractive index curve, marked with $SiO_2$, is for the cladding. Therefore, it is not easy to obtain optical fiber devices with various spectral properties by using typical fibers.

Now, the present invention will be described in detail with reference to the accompanying drawings. A dispersive optical fiber according to the present invention employs silica as base material of the core and the cladding. Dispersive materials are doped into the silica forming the core and the cladding, thereby fabricating the dispersive optical fiber using a typical optical fiber fabricating method.

In the embodiment of the present invention, boron and fluorine are used as the dispersive materials, but the present invention is not limited thereto. Any two materials that have a specific cross wavelength at which the refractive index curves of the two materials cross each other can be used.

The optical fiber according to the present invention exhibits filter characteristics by doping boron and fluorine into silica glass, respectively. The filter characteristics change depending on the kind and amount of dispersive material doped into either the core or the cladding.

Figure 2:
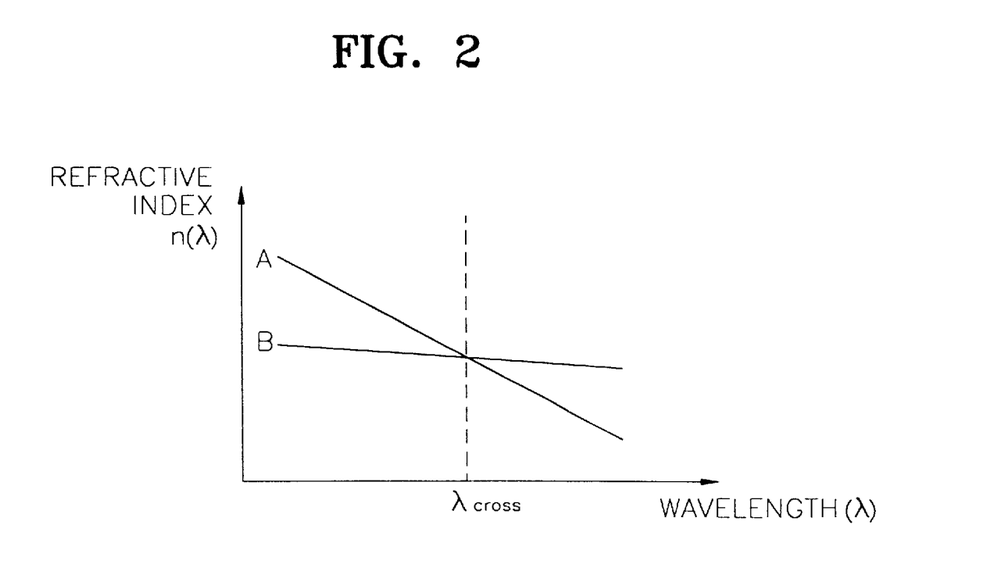
FIG. 2 is a graph illustrating that the refractive index difference between the core and the cladding changes depending on wavelength.

According to filter characteristics, filters are largely classified into short wavelength pass filters and long wavelength pass filters. For example, when the refractive index difference between material A and material B changes depending on wavelength, as shown in FIG. 2, the refractive index of the material A becomes equal to that of the material B at a specific wavelength $\lambda_{cross}$. In a region of wavelength shorter than the cross wavelength $\lambda_{cross}$, the refractive index of the material A is greater than that of the material B. Thus, the material A is used as the core material and the material B becomes the cladding material. In such a case, light of a wavelength shorter than the cross wavelength $\lambda_{cross}$ is guided through the core, and light of a wavelength longer than the cross wavelength $\lambda_{cross}$ is dispersed. That is to say, when the core is made of the material A and the cladding is made of the material B, a light signal is applied to one end of the optical fiber and then the light output to the other end of the optical fiber is measured. Then, light of the signal having a wavelength shorter than the cross wavelength $\lambda_{cross}$ is guided through the core to then be produced at the output port of the optical fiber. However, light of the signal having a wavelength longer than the cross wavelength $\lambda_{cross}$ is dispersed outside the optical fiber, rather than being guided, so that it is not produced at the output port of the optical fiber. Therefore, since the above-described optical fiber only filters light having a wavelength shorter than the cross wavelength $\lambda_{cross}$, it operates as a short wavelength pass filter.

Figure 3A:
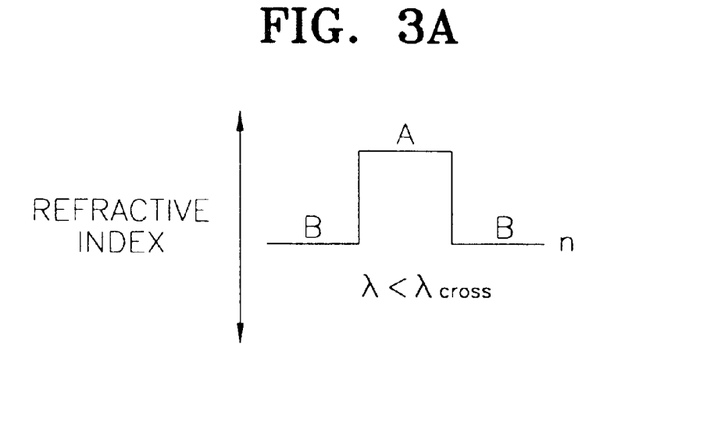
FIGS. 3A, 3B and 3C are diagrams illustrating the relationship between refractive indices of the core and the cladding depending on wavelength, in the case of a short wavelength pass filter, and a power profile.
Figure 3B:
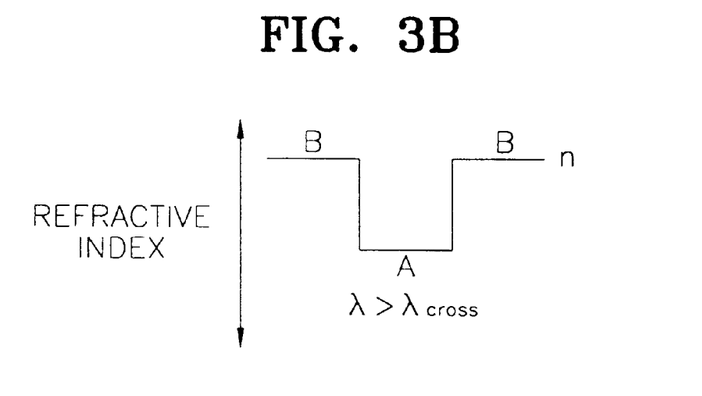
Figure 3C:
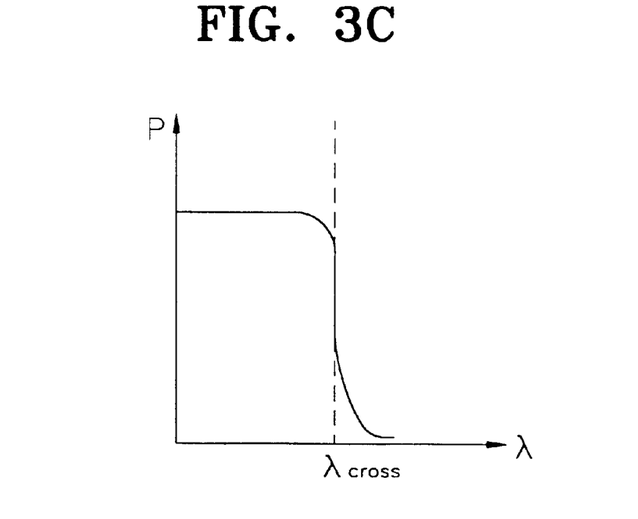

FIGS. 3A and 3B illustrate the dependence of the refractive index characteristics of a fiber on the wavelength of an incident light signal, in the case when the core is made of material A and the cladding is made of material B. In detail, FIG. 3A illustrates the refractive index profile, across the diameter of the fiber, of the core and the cladding in the case of a light signal having a wavelength shorter than the cross wavelength $\lambda_{cross}$, and FIG. 3B illustrates the refractive index profile of the core and the cladding in the case of a light signal having a wavelength longer than the cross wavelength $\lambda_{cross}$. FIG. 3C shows the dependency of the power (P) profile on wavelength, from which it is understood that the above-constructed optical fiber operates as a short wavelength pass filter.

Figure 4A:
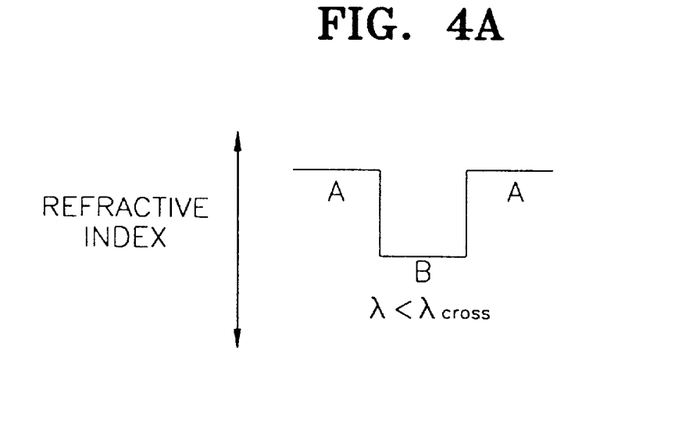
FIGS. 4A, 4B and 4C are diagrams illustrating the relationship between refractive indices of the core and the cladding depending on wavelength, in the case of a long wavelength pass filter, and a power profile.
Figure 4B:
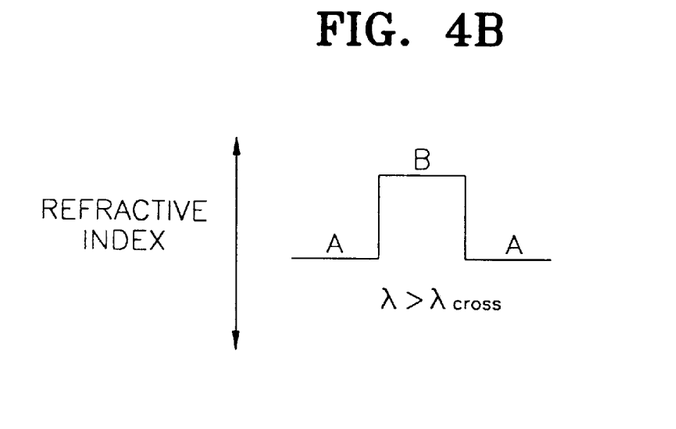
Figure 4C:
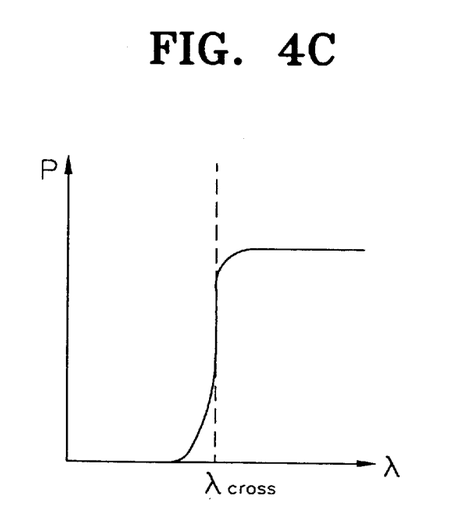

Conversely, in order to guide a light signal having a wavelength longer than the cross wavelength $\lambda_{cross}$ the core is made of the material B and the cladding is made of the material A. FIGS. 4A and 4B illustrate the dependency of the refractive index characteristics of an incident light signal on wavelength. FIG. 4A illustrates the refractive index profile of the core and the cladding in the case of a light signal having a wavelength shorter than the cross wavelength $\lambda_{cross}$, and FIG. 4B illustrates the index profile of the core and the cladding in the case of a light signal having a wavelength longer than the cross wavelength $\lambda_{cross}$. FIG. 4C shows the dependency of the power (P) profile on wavelength, from which it is understood that the above-constructed optical fiber operates as a long wavelength pass filter which guides light having a wavelength longer than the cross wavelength $\lambda_{cross}$.

By concatenating the short wavelength pass filter and the long wavelength pass filter, a band pass filter can be attained. In other words, by overlapping the bands filtered by the short wavelength pass filter and the long wavelength pass filter, a band pass filter which only filters light in the overlapping bands can be fabricated.

In order to attain a short wavelength pass filter, the core is formed of a silica-based material and boron (B) is doped into the silica-based material, and the cladding is formed of a silica-based material and fluorine (F) is doped into the silica-based material. The dopant concentration of boron doped into the core is preferably about 3.28 mole %, and the dopant concentration of fluorine doped into the cladding is preferably about 1.57 mole %.

Figure 5:
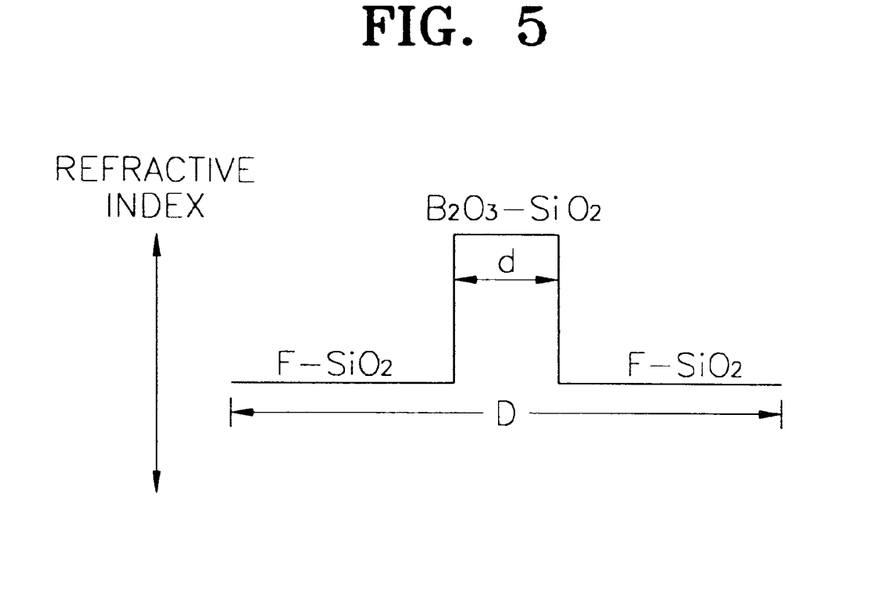
FIG. 5 illustrates the refractive index profile of a dispersive optical fiber operating as a short wavelength pass filter according to the present invention, for He—Ne laser irradiation.

FIG. 5 illustrates the refractive index profile of a dispersive optical fiber operating as a short wavelength pass filter according to the present invention, for He—Ne laser irradiation, in which d denotes the core diameter, and D denotes the cladding diameter. The core is made of $B_2O_3$—$SiO_2$ and the refractive index thereof is 1.4555 for He—Ne laser irradiation. The cladding is made of F—$SiO_2$ and the refractive index thereof is 1.4546 for He—Ne laser irradiation. Here, the wavelength of the He—Ne laser is 632.8 nm. The refractive index of glass varies according to the wavelength of light. Thus, if the wavelength of incident light varies, the refractive indices of the core and the cladding and the refractive index difference therebetween vary accordingly.

On the other hand, in order to attain a long wavelength pass filter, unlike the short wavelength pass filter, the core is formed of fluorine-doped silica, and the cladding is formed of boron-doped silica. The dopant concentration of fluorine doped into the core is preferably about 2.1 mole %, and the dopant concentration of boron doped into the cladding is preferably 7.8 mole %.

Figure 6:
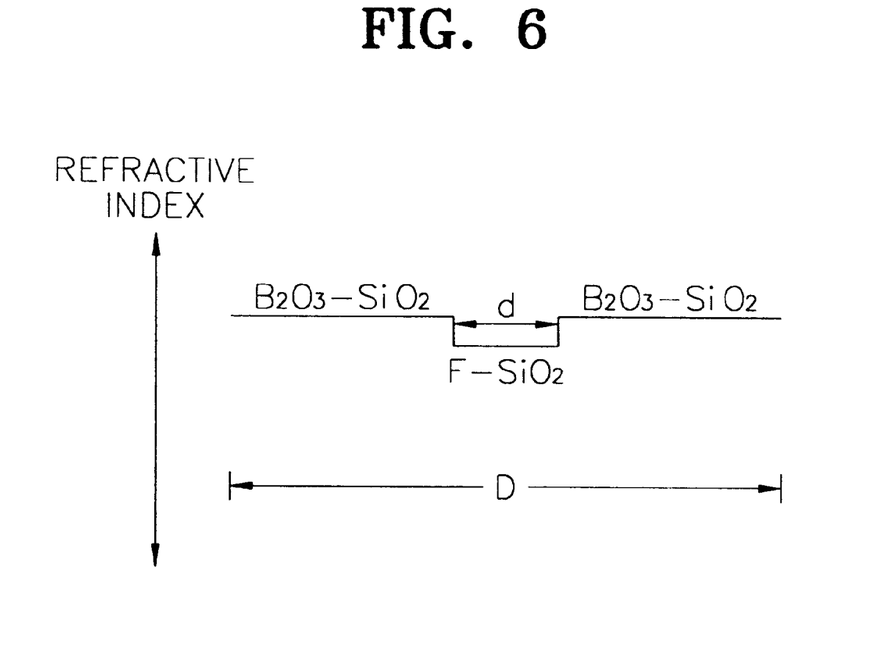
FIG. 6 illustrates the refractive index profile of a dispersive optical fiber operating as a long wavelength pass filter according to the present invention, for He—Ne laser irradiation.

FIG. 6 illustrates the refractive index profile of a dispersive optical fiber operating as a long wavelength pass filter according to the present invention, for He—Ne laser irradiation, in which d denotes the core diameter, and D denotes the cladding diameter. The core is made of F—$SiO_2$ and the refractive index thereof is 1.4538 for He—Ne laser irradiation. The cladding is made of $B_2O_3$—$SiO_2$ and the refractive index thereof is 1.4539 for He—Ne laser irradiation. Here, since the wavelength of the He—Ne laser is relatively short, that is, 632.8 nm, the profile for He—Ne irradiation shows that the refractive index of the core is smaller than that of the cladding. Thus, the He—Ne laser cannot be guided through the core. However, in the case of the light having a wavelength much longer than that of the He—Ne laser, e.g., 1500 nm, the refractive index of the core may be larger than that of the cladding. Thus, the light is guided through the core.

Generally, the refractive index of glass varies according to wavelength of the light used. The optical fiber filter according to the present invention can adjust the wavelength of light filtered thereby, according to the dopant concentrations of boron and fluorine.

Figure 7A:
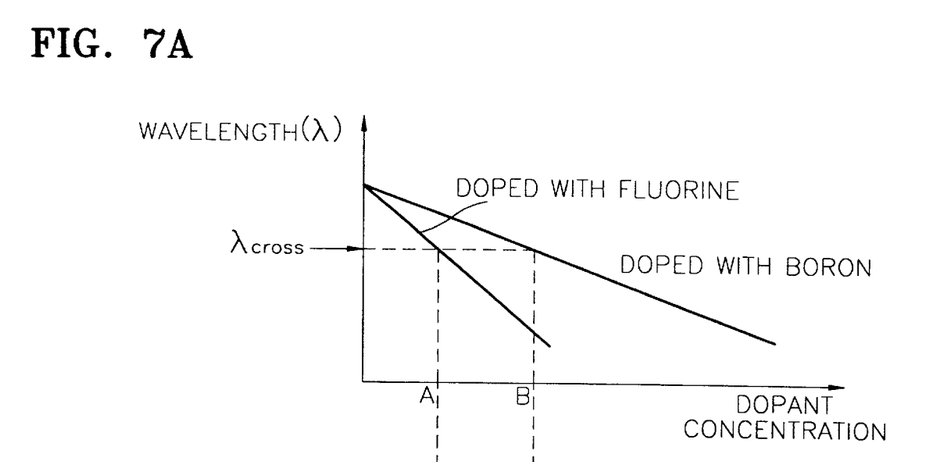
FIGS. 7A and 7B are diagrams for illustrating a method for determining the dopant concentrations of boron and fluorine, in which the refractive indices of the core and the cladding become equal at a specific wavelength.
Figure 7B:
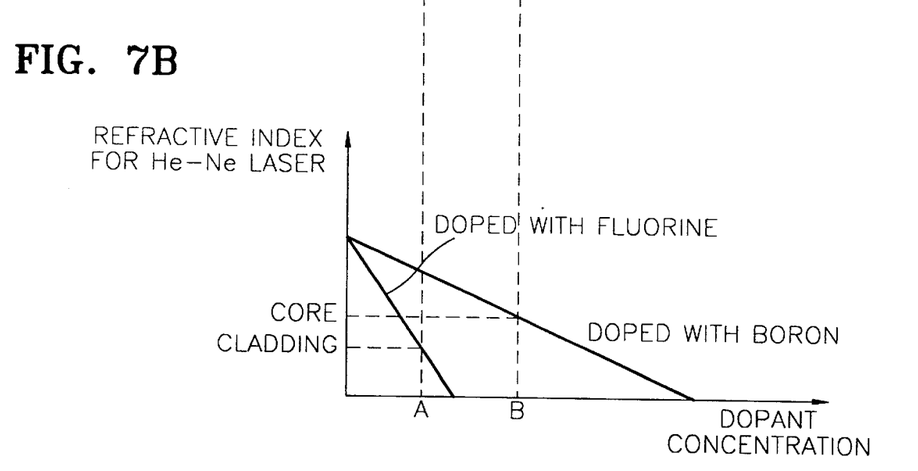

FIGS. 7A and 7B are diagrams for illustrating a method for determining the dopant concentrations of boron and fluorine, at which the refractive indices of the core and the cladding become equal at a specific wavelength, in which FIG. 7A is a graph showing the dopant concentrations of boron and fluorine at a specific cross wavelength ($\lambda_{cross}$), and FIG. 7B is a graph showing the refractive index for a He—Ne laser when the core and the cladding are formed of boron and fluorine of the dopant concentrations shown in FIG. 7A, respectively. In other words, as shown in FIG. 7B, when the core is doped with boron to a dopant concentration (B) and the cladding is doped with fluorine to a dopant concentration (A), the refractive index for the He—Ne laser is larger in the core than in the cladding, from which it is understood that the short wavelength pass filter characteristic is exhibited, that is, only light having a wavelength shorter than the cross wavelength is filtered thereby.

Figure 8:
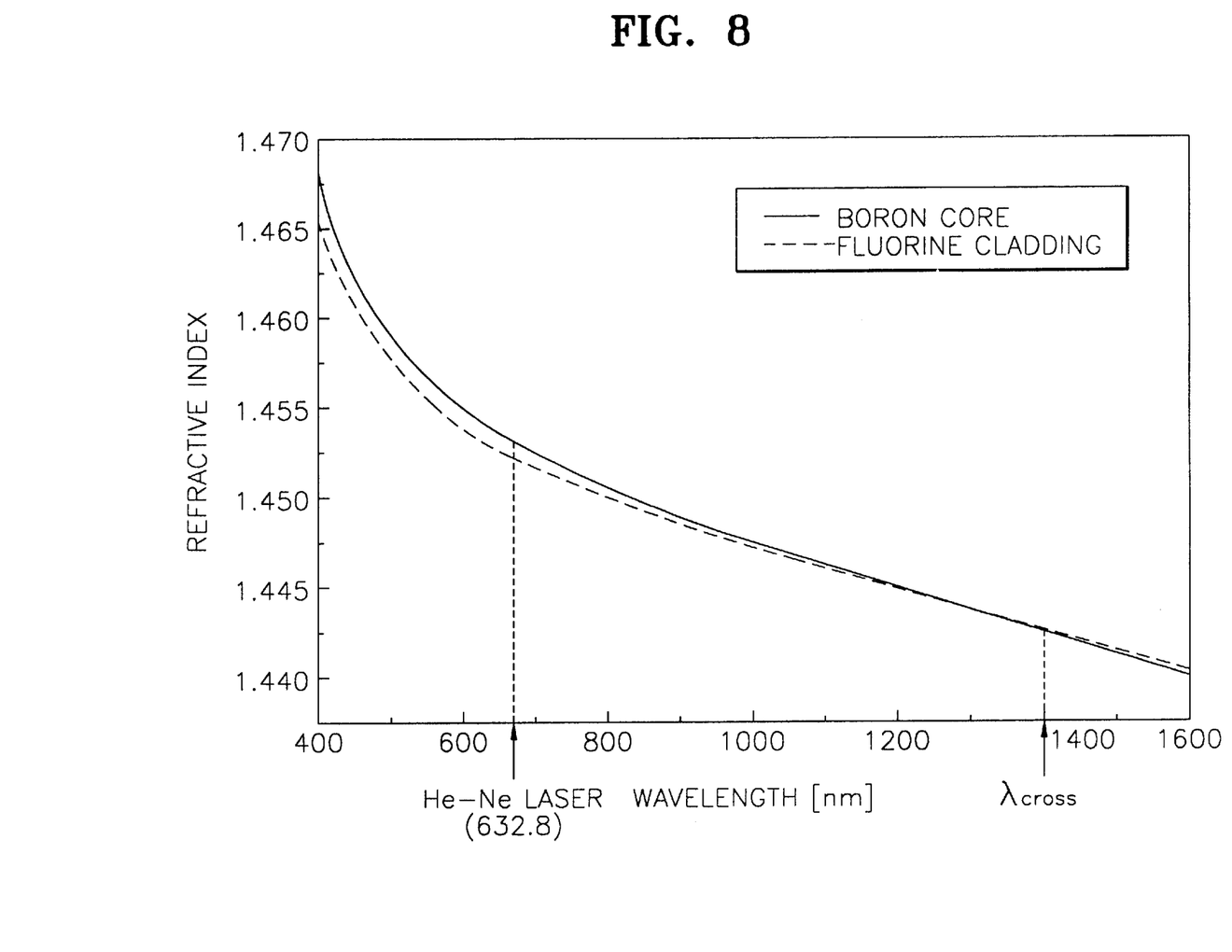
FIG. 8 shows the wavelength-dependent refractive indices of optical fibers fabricated by the method shown in FIGS. 7A and 7B.

FIG. 8 shows the wavelength-dependent refractive indices of optical fibers fabricated by the method shown in FIGS. 7A and 7B, in which the cross wavelength ($\lambda_{cross}$) is approximately 1400 nm. Thus, if boron is doped into the core and fluorine is doped into the cladding, the optical fiber operates as a short wavelength pass filter for filtering the light having a wavelength shorter than 1.4 μm. In the case of light having a wavelength longer than 1.4 μm, the refractive index of the cladding is larger than that of the core. Therefore, light cannot pass through the core of the optical fiber.

Figure 9:
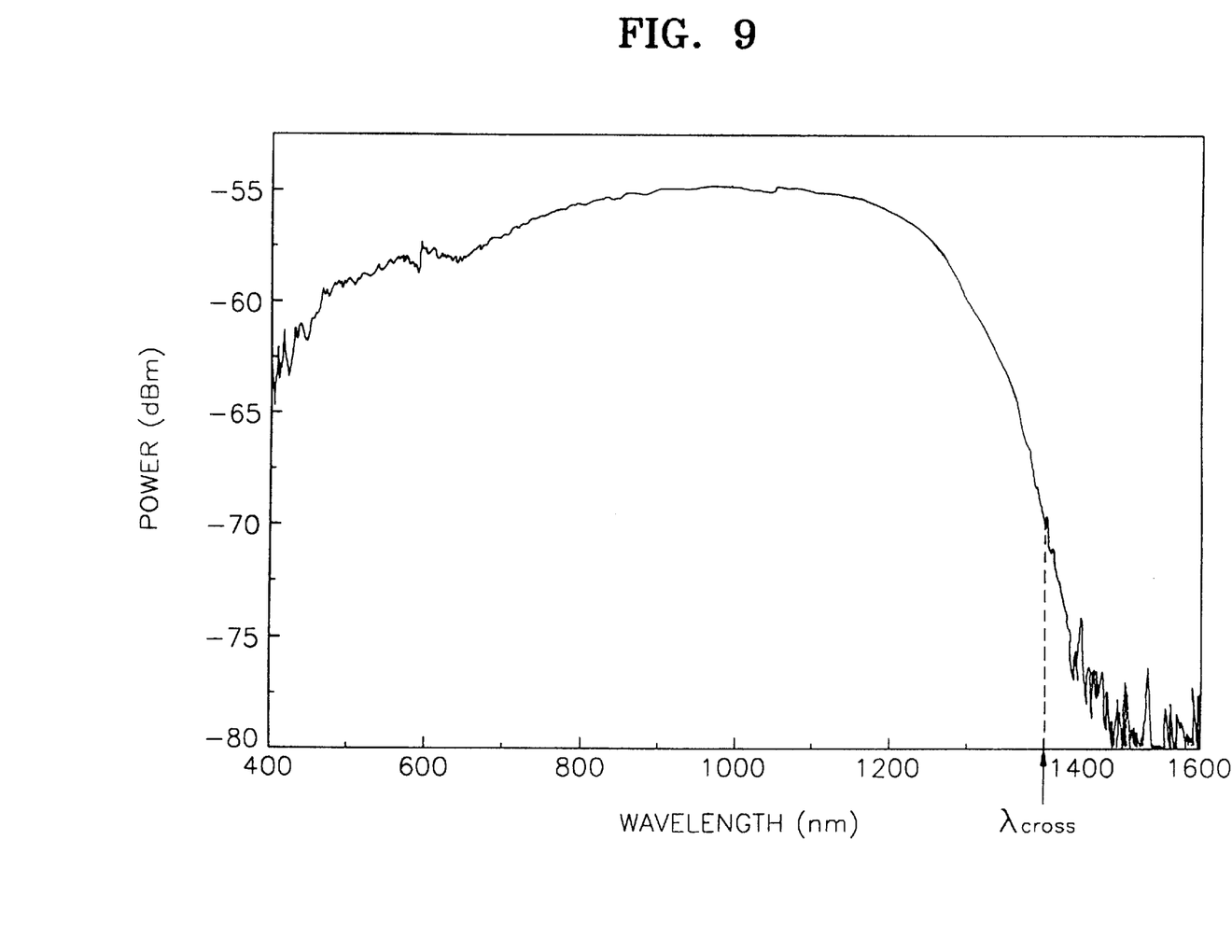
FIG. 9 illustrates transmission characteristics of a short wavelength pass filter fabricated by the method shown in FIGS. 7A and 7B.

FIG. 9 illustrates transmission characteristics of a short wavelength pass filter fabricated by the method shown in FIGS. 7A and 7B. It is understood from FIG. 10 that the light having a wavelength shorter than 1.4 μm is detected at an output port of the filter, and light having a wavelength longer than 1.4 μm is not guided through the core.

Figure 10:
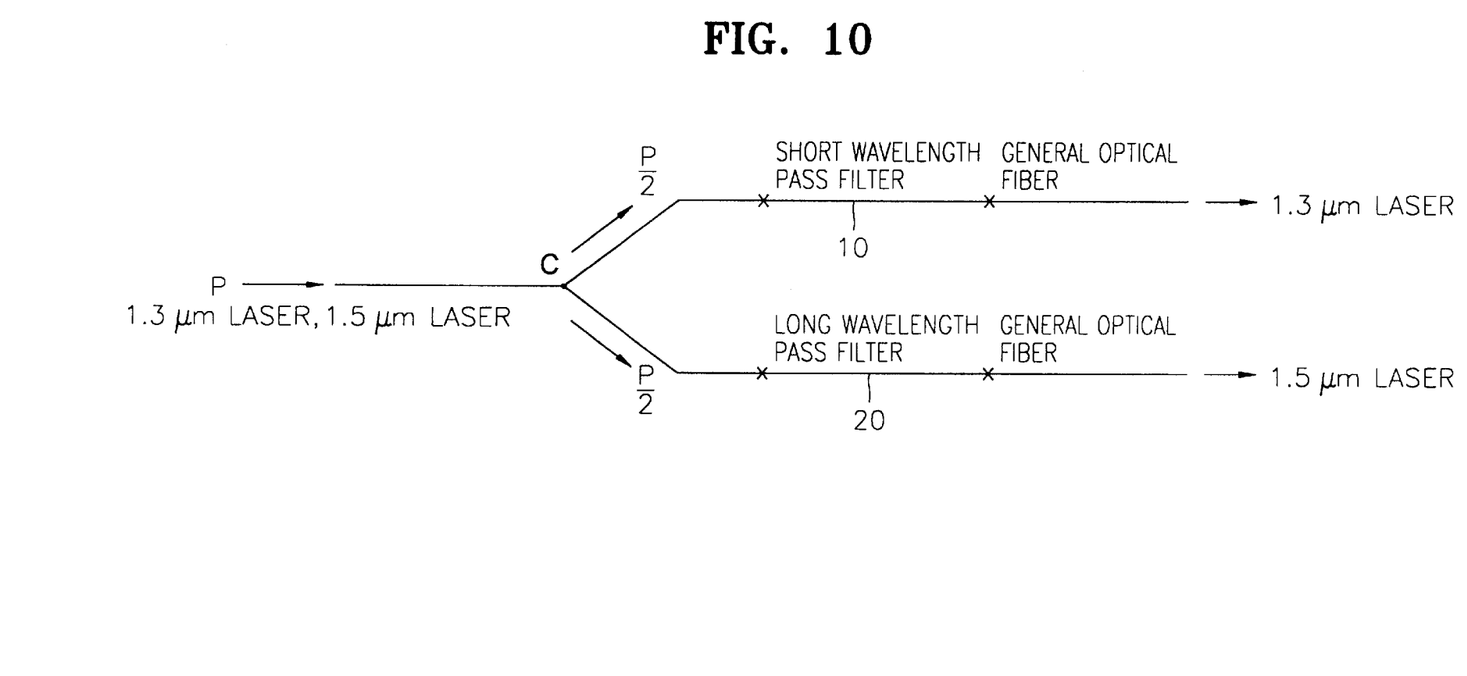
FIG. 10 is a diagram for illustrating an example of a wavelength divider implemented using a dispersive optical fiber according to the present invention.

FIG. 10 is a diagram for illustrating an example of a wavelength divider implemented using a dispersive optical fiber according to the present invention. The wavelength divider shown in FIG. 10 is Y-branch shaped, and a short wavelength pass filter 10 and a long wavelength pass filter 20 using dispersive optical fibers are disposed at the respective output ports on the branched side of the Y-branch shaped wavelength divider. For example, as shown in FIG. 10, the short wavelength pass filter 10 for filtering light of a wavelength shorter than 1.35 μm is disposed at one of the branched output ports, and the long wavelength pass filter 20 for filtering light of a wavelength longer than 1.45 μm is disposed at the other of the branched output ports.

If light in which a 1.3 μm laser and a 1.5 μm laser are multiplexed is incident into the input port with the power (P) and passes through a branching point C, the power at the branching point C is divided into half of the initial power (P), that is, (P/2), to then be transferred to the respective output ports. Then, the 1.3 μm laser is filtered by the short wavelength pass filter 10 but the 1.5 μm laser is not. On the other hand, the 1.5 μm laser is filtered by the long wavelength pass filter 20 but the 1.3 μm laser is not.

The dispersive optical fiber and the optical fiber filter according to the present invention can be fabricated by depositing silica, boron and fluorine in a silica tube using a modified chemical vapor deposition (MCVD) method. Here, the reaction temperature is preferably 1900° C. or lower.

By appropriately concatenating the short wavelength pass filter and the long wavelength pass filter, a band pass filter and a band-rejection filter can be fabricated. This is easily embodied by one skilled in the art, and an explanation will be omitted herein. The dispersive optical fibers according to the present invention can also be adopted to applicable fields of conventional dispersive optical fibers, including optical subscriber networks, wavelength division couplers, wavelength division multiplexers, within the scope of the invention.

According to the present invention, dispersive optical fibers are fabricated by doping each dispersive material into a core and a cladding, thereby minimizing transmission loss, and are capable of being coupled to general optical fibers with low loss. Also, the dispersive optical fibers can be fabricated by a MCVD method, rather than a rod-in tube method, which facilitates the fabrication process.

What is claimed is:

1. A dispersive optical fiber, comprising:
   a core consisting essentially of silica doped with boron; and
   a cladding consisting essentially of silica doped with fluorine, said cladding surrounding the core.

2. The optical fiber of claim 1, the concentration of boron in said core being approximately 3.28 mol-%.

3. The optical fiber of claim 1, the refractive index of said core being approximately 1.4555 at 632.8 nm.

4. The optical fiber of claim 1, the concentration of fluorine in said cladding being approximately 1.57 mol-%.

5. The optical fiber of claim 1, the refractive index of said cladding being approximately 1.4546 at 632.8 nm.

6. The optical fiber of claim 2, the concentration of fluorine in said cladding being approximately 1.57 mol-%.

7. The optical fiber of claim 3, the refractive index of said cladding being approximately 1.4546 at 632.8 nm.

8. The optical fiber of claim 1, further comprising:
   a second optical fiber spliced to the dispersive optical fiber, said second optical fiber comprising:
      a core consisting essentially of silica doped with fluorine; and
      a cladding consisting of essentially of silica doped with boron, said cladding surrounding the core;
   said dispersive optical fiber and said second optical fiber for use as a bandpass filter.

9. The optical fiber of claim 1, further comprising:
a Y-branch optical splitter coupled at one branch to said dispersive optical fiber; and
a second optical fiber spliced to the other branch of the Y-branch optical splitter, said second optical fiber comprising:
   a core consisting essentially of silica doped with fluorine; and
   a cladding consisting essentially of silica doped with boron, said cladding surrounding the core;
said spliced Y-branch optical splitter, said dispersive optical fiber and said second optical fiber for use as a wavelength divider.

10. A dispersive optical fiber, comprising:
a core consisting essentially of silica doped with fluorine; and
a cladding consisting essentially of silica doped with borone, said cladding surrounding the core.

11. The optical fiber of claim 10 the concentration of boron in said cladding being approximately 7.8 mol-%.

12. The fiber of claim 10 the refractive index of said cladding being approximately 1.4539 at 632.8 nm.

13. The optical fiber of claim 10, the concentration of fluorine in said core being approximately 2.1 mol-%.

14. The optical fiber of claim 10 the refractive index of said core being approximately 1.4538 at 632.8 nm.

15. The optical fiber of claim 11, the concentration of fluorine in said core being approximately 2.1 mol-%.

16. The optical fiber of claim 12 the refractive index of said core being approximately 1.4538 at 632.8 nm.

* * * * *